(12) United States Patent
Mullis, II et al.

(10) Patent No.: US 8,171,502 B2
(45) Date of Patent: May 1, 2012

(54) METHODS, DEVICES AND COMPUTER PROGRAM PRODUCTS FOR AUTOMATICALLY INSTALLING DEVICE DRIVERS FROM A PERIPHERAL DEVICE ONTO A HOST COMPUTER

(75) Inventors: Samuel L. Mullis, II, Raleigh, NC (US); William Lennon, Cary, NC (US); Philip Elcan, Hillsborough, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1402 days.

(21) Appl. No.: 11/564,553

(22) Filed: Nov. 29, 2006

(65) Prior Publication Data

US 2008/0127225 A1 May 29, 2008

(51) Int. Cl.
*G06F 9/48* (2006.01)
(52) U.S. Cl. ............... 719/321; 710/8; 710/10; 710/302
(58) Field of Classification Search .................. None
See application file for complete search history.

(56) References Cited

U.S. PATENT DOCUMENTS

| | | | | |
|---|---|---|---|---|
| 5,968,136 A | * | 10/1999 | Saulpaugh et al. | 710/3 |
| 6,006,228 A | * | 12/1999 | McCollum et al. | 1/1 |
| 6,185,521 B1 | | 2/2001 | Vishlitzky | |
| 6,704,824 B1 | | 3/2004 | Goodman | |
| 6,738,834 B1 | * | 5/2004 | Williams et al. | 710/8 |
| 6,754,725 B1 | | 6/2004 | Wright et al. | |
| 6,832,273 B2 | | 12/2004 | Ray et al. | |
| 2002/0023189 A1 | | 2/2002 | Fensore et al. | |
| 2003/0046447 A1 | | 3/2003 | Kouperchliak et al. | |
| 2003/0163611 A1 | | 8/2003 | Nagao | |
| 2003/0204950 A1 | | 11/2003 | Chou et al. | |
| 2004/0205778 A1 | | 10/2004 | Wong et al. | |
| 2005/0038934 A1 | | 2/2005 | Gotze et al. | |
| 2005/0060447 A1 | | 3/2005 | Tanaka | |
| 2005/0097572 A1 | | 5/2005 | Chrysanthakopoulos et al. | |

(Continued)

FOREIGN PATENT DOCUMENTS

DE 103 36 877 B3 2/2005

(Continued)

OTHER PUBLICATIONS

John S. Howard, USB Interface Association Descriptor device class code and use model, Jul. 23, 2003, Revision 1.0, pp. 1-3.*

(Continued)

*Primary Examiner* — S Sough
*Assistant Examiner* — Syed Roni
(74) *Attorney, Agent, or Firm* — Myers Bigel Sibley & Sajovec, P.A.

(57) ABSTRACT

One or more custom device drivers for a peripheral device may be installed from the peripheral device onto a host computer. Upon connecting the peripheral device to the host computer, an operating system of the host computer is exposed to a default configuration of the peripheral device that contains only a device driver class interface or interfaces for which the operating system includes preinstalled class level device drivers. The peripheral device then receives an install command from the host computer, and automatically transmits one or more custom device drivers from the peripheral device to the host computer. In response to receipt of a change command from the host computer, the configuration of the peripheral device is changed to an alternate configuration that includes interfaces for the custom device drivers.

16 Claims, 5 Drawing Sheets

U.S. PATENT DOCUMENTS

| | | | |
|---|---|---|---|
| 2005/0102441 A1* | 5/2005 | Yeh et al. | 710/8 |
| 2005/0278461 A1 | 12/2005 | Ohta | |
| 2006/0037015 A1 | 2/2006 | Mihai | |
| 2006/0117136 A1 | 6/2006 | Tran et al. | |
| 2007/0271558 A1* | 11/2007 | Lim et al. | 717/174 |

FOREIGN PATENT DOCUMENTS

| | | |
|---|---|---|
| EP | 1 246 071 A1 | 10/2002 |
| JP | 2001-222503 A | 8/2001 |
| JP | 2006-293638 | 10/2006 |
| WO | WO 99/01820 A1 | 1/1999 |
| WO | WO 03/012577 A2 | 2/2003 |
| WO | WO 03/012577 A3 | 2/2003 |
| WO | WO 2004/008313 A1 | 1/2004 |
| WO | WO 2005/111820 A1 | 11/2005 |
| WO | WO 2005/116845 A1 | 12/2005 |
| WO | WO 2006/075397 A1 | 7/2006 |

OTHER PUBLICATIONS

Notification of Transmittal of the International Search Report and the Written Opinion of the International Searching Authority, or the Declaration, International Search Report and Written Opinion on the International Searching Authority, PCT/US2007/025897, Jun. 20, 2008.

"USB in a NutShell" *Beyond Logic*. Website. <http://www.beyondlogic.org/usbnutshell/usb3.htm> Chapter 3—USB Protocols, 6 pages. Accessed May 4, 2007.

"USB in a NutShell" *Beyond Logic*. Website. <http://www.beyondlogic.org/usbnutshell/usb4.htm> Chapter 4—Endpoint Types, 8 pages. Accessed May 4, 2007.

Notification of Transmittal of the International Search Report and the Written Opinion of the International Searching Authority, or the Declaration, International Search Report and Written Opinion on the International Searching Authority, PCT/US2007/013295, Nov. 16, 2007.

Chinese Office Action corresponding to Chinese Application No. 200780052907.0 issued Jan. 13, 2011.

Japanese Office Action corresponding to Japanese Application No. 2010-507373 issued Aug. 22, 2011.

* cited by examiner

METHODS, DEVICES AND COMPUTER PROGRAM PRODUCTS FOR AUTOMATICALLY INSTALLING DEVICE DRIVERS FROM A PERIPHERAL DEVICE ONTO A HOST COMPUTER

FIELD OF THE INVENTION

This invention relates to peripheral devices for use with host computers and, more particularly, to device drivers for peripheral devices.

BACKGROUND OF THE INVENTION

Host computers ("hosts"), such as Windows-based personal computers, may operate with many peripheral devices, such as keyboard, mouse, monitor, printer, scanner, mass storage and/or other peripheral devices. A Universal Serial Bus (USB) can be used to connect these and/or other peripheral devices to the host computer. The USB can provide a connection for peripheral devices to host computers using a standard connector and form factor, and also permits the connection and disconnection of USB-compatible peripheral devices while the host computer is turned on.

As is also well known to those having skill in the art, in order to achieve the full operability of a peripheral device, a driver for the peripheral device typically needs to be present or installed on the host computer for each peripheral device. An operating system on the host computer, such as a Windows or Linux operating system, typically includes drivers for various classes of USB-based peripheral devices, such as audio, printer, communication, mass storage and human interface devices. When the peripheral device is connected to the USB, the connected peripheral device may be identified by the host computer using a hardware identifier that is transmitted by the peripheral device, and then the device class is ascertained. The hardware identifier/device class may be transmitted to the host computer by the peripheral device as part of a "configuration" message, in which the peripheral device notifies the host computer of its attributes. Using the ascertained device class, the operating system loads the appropriate driver, which is then entered into a registry and can be assigned on the basis of this entry when the peripheral device is connected again in the future.

As the number and type of peripheral devices for host computers continue to expand, many of these peripheral devices may not belong to any of the defined device classes that are preinstalled in the operating system. In these situations, an installation disk or CD is generally provided from which the driver(s) can be loaded onto the host computer. This installation process also may require user input, in which the user may need to have detailed knowledge of the peripheral device and of the host computer.

Attempts have been made to reduce or eliminate the need for a separate installation disk/CD and/or the complexity of the driver installation process by providing drivers that are stored in a memory of the USB-based peripheral device itself. For example, U.S. Pat. No. 6,754,725 to Wright et al., is entitled USB Peripheral Containing Its Own Device Driver. As noted in the Abstract of this patent, a peripheral device comprises a computer readable media and an interface circuit. The computer readable media may be configured to store instructions for operating the peripheral device. The interface circuit may be configured to communicate the instructions to an operating system of a computer in response to connection of the peripheral device to the computer. Moreover, U.S. Patent Application Publication 2005/0038934 to Gotze et al., entitled USB-Based Peripheral Device and Method for Starting Up the USB-Based Peripheral Device provides a USB-based peripheral device for operation with a host system, having a driver for operation with the host system, wherein the driver is stored in a memory in the USB-based peripheral device, and with startup of the peripheral device on the host system, prompting-automatic installation of the driver on the host system, as noted in the Abstract thereof. Finally, U.S. Patent Application Publication 2006/0037015 to Mihai, entitled Embedded Driver for Bus-Connected Device, provides a device including a storage component to store a driver for the device, and a device protocol handler to enable automatic upload of the driver to a storage subsystem of a processor based system in response to the device being communicatively coupled to a bus of the processor based system, as noted in the Abstract thereof.

Unfortunately, however, user input during device driver installation may still be needed, even when the device driver(s) for a peripheral device are stored on the peripheral device itself. Moreover, many peripheral devices, such as USB-based peripheral devices, may be carried from host computer to host computer by a user. In these situations, the device driver installation process may need even more user intervention, even though the device driver is stored on the peripheral device itself.

SUMMARY OF THE INVENTION

One or more custom device drivers for a peripheral device may be installed from the peripheral device onto a host computer by performing the following by the peripheral device: upon connecting the peripheral device to the host computer, an operating system of the host computer is exposed to a default configuration of the peripheral device that contains only a device driver class interface or interfaces for which the operating system includes preinstalled class level device drivers, and at least one of which includes an automatic run routine. Stated differently, the default configuration comprises a device driver class interface or interfaces for which the operating system includes preinstalled class level device drivers, at least one of which includes an automatic run routine, but does not comprise a device driver class interface for which the operating system does not include a preinstalled class level device driver.

The peripheral device then receives an install command directly from the automatic run routine in the host computer and/or from an executable routine in the host computer that is pointed to by the automatic run routine, and, in response, automatically transmits one or more custom device drivers from the peripheral device to the host computer. Then, in response to a receipt of a change command from the one or more custom device drivers that are transmitted to the host computer, the configuration of the peripheral device is changed from the default configuration to an alternate configuration that includes interfaces for the one or more custom device drivers that were transmitted to the host computer.

Upon subsequently connecting the peripheral device to the host computer, the operating system on the host computer is again exposed to the default configuration of the peripheral device that contains only a driver class interface or interfaces for which the operating system includes preinstalled class level device drivers, at least one of which includes an automatic run routine. However, the operating system will load the one or more custom device drivers rather than the preinstalled driver(s). Then, in response to receipt of the change command from the one or more custom device drivers on the host computer, the configuration of the peripheral device is changed from the default configuration to the alternate configuration that includes interfaces for the one or more custom device drivers that were transmitted to the host computer.

In order to effectuate the above-described automatic installation, the following may be performed by the host computer: in response to exposure of the host computer to the default configuration of the peripheral device that contains only a device driver class interface or interfaces for which the operating system includes preinstalled class level device drivers, at least one of which includes an automatic run routine, the host computer loads at least one of the device driver class interface or interfaces for which the operating system includes preinstalled class level device drivers, at least one of which includes an automatic run routine. The automatic run routine is then executed to directly and/or indirectly issue the install command to the peripheral device. Then, in response to receiving the one or more custom drivers from the peripheral device, the one or more custom device drivers are installed on the host computer.

Moreover, the host computer can perform the following operations in response to initial exposure or subsequent exposure of the operating system on the host computer to the default configuration of the peripheral device that contains only a driver class interface or interfaces for which the operating system includes preinstalled class level device drivers, at least one of which includes an automatic run routine: if a custom device driver that matches a product identification for the peripheral device is already installed in the operating system, the custom device driver is loaded and a change command is issued to the peripheral device to change its configuration from the default configuration to the alternate configuration. Moreover, if a custom device driver that matches a product identification for the peripheral device is not installed in the operating system, at least one of the driver class interface or interfaces for which the operating system includes preinstalled class level device drivers, at least one of which includes an automatic run routine, is loaded. The automatic run routine is then executed to issue the install command to the peripheral device, and in response to receiving the one or more custom device drivers from the peripheral device (directly from the automatic run routine and/or from the executable routine that is pointed to by the automatic run routine), the one or more custom device drivers is installed on the host computer.

In some embodiments, the operating system is a Windows operating system, the peripheral device is a USB device, and the device driver class interfaces, or interfaces for which the operating system includes preinstalled class level device drivers, at least one of which includes an automatic run routine, comprise a mass storage device class interface. Moreover, in some embodiments, the custom device drivers may comprise a custom mass storage device driver, a custom modem device driver and a custom network device driver. Moreover, in yet other embodiments, one or more of the custom device drivers may be "signed", so that the one or more signed custom device drivers may be automatically installed on the host computer, without requiring user confirmation.

It will be understood that embodiments of the present invention have been described above in connection with methods that are performed by the peripheral device and/or by the host computer, to automatically install one or more custom device drivers from the peripheral device onto the host computer. However, analogous systems (functionality), devices and/or computer program products also may be provided according to other embodiments of the present invention.

Peripheral devices themselves also may be provided according to other embodiments of the present invention. These peripheral devices include a plurality of custom devices for which custom device drivers are not preinstalled in an operating system of the host computer. The peripheral devices also include a default configuration that contains only a device driver class interface or interfaces for which the operating system includes preinstalled class level device drivers. The peripheral devices also include an alternate configuration that includes custom device driver interfaces for the plurality of custom device drivers. A plurality of custom device drivers for the plurality of custom devices is also included. A controller is also provided in the peripheral devices that is configured to expose the default configuration to the operating system of the host computer upon connection of the peripheral device to the host computer, to transmit the plurality of custom device drivers to the host computer in response to an install command from the host computer, and to switch from the default configuration to the alternate configuration in response to a change command from the host computer.

DETAILED DESCRIPTION

Figure 1:
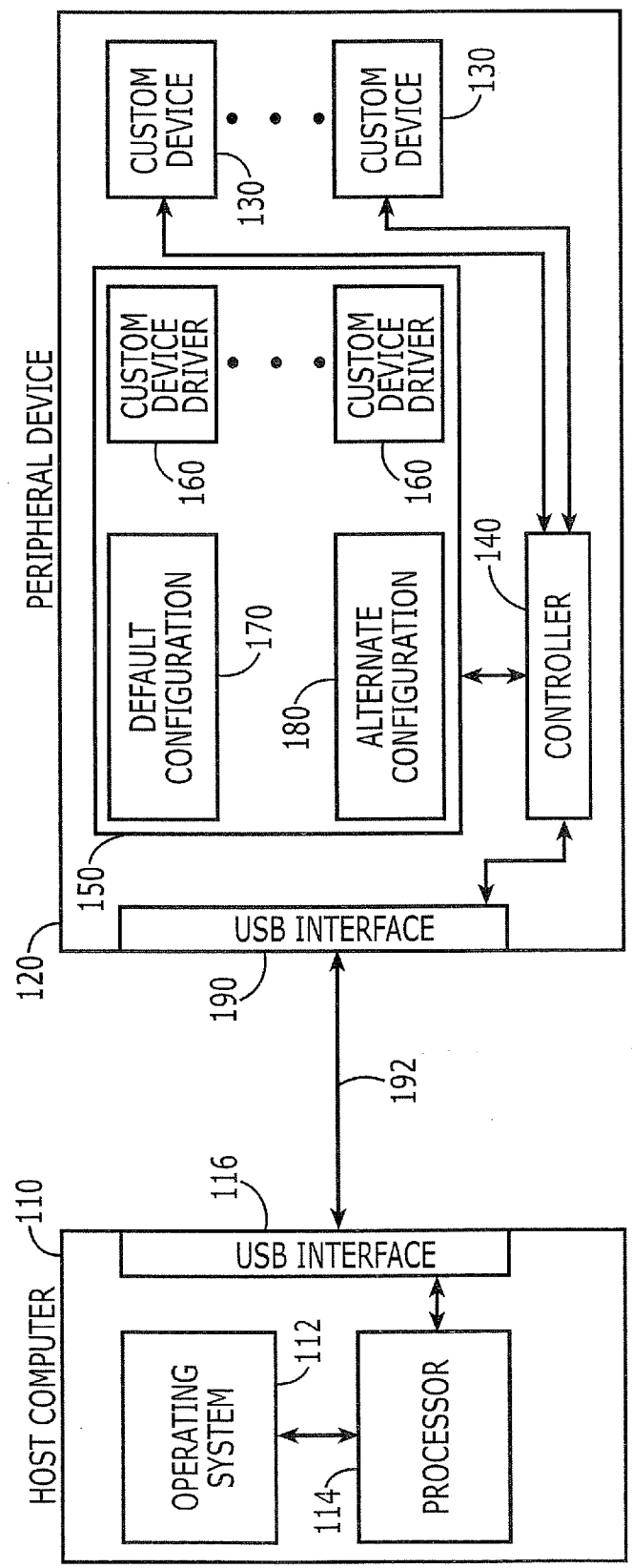
FIG. 1 is a block diagram of a host computer and peripheral device that can automatically install device drivers for the peripheral device according to various embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

FIG. 1 is a block diagram of a host computer and a peripheral device according to various embodiments of the present invention. Referring to FIG. 1, the host computer 110 includes a processor 114 and an operating system 112. In some embodiments, the host computer is a Personal Computer (PC) or a Macintosh, the processor 114 is an Intel or compatible processor, and the operating system is a Windows, Linux, Macintosh and/or other conventional host computer operating system. One or more peripheral interfaces, such as a USB interface 116, also is provided. It will be understood by those having skill in the art that FIG. 1 illustrates a simplified block diagram of the host computer 110, and that many other software and hardware components generally may be provided. The overall design and operation of host computers 110 are well known to those having skill in the art and need not be described further herein.

Still referring to FIG. 1, the peripheral device 120 is configured to connect to the host computer 110 using a peripheral device interface, such as a USB interface 190, and a USB 192. However, many other peripheral interfaces may be used. The design and operation of USB are well known to those having skill in the art and need not be described further herein.

The peripheral device 120 includes a controller 140 that may include a general purpose and/or custom processor, customized hardware and/or software. One or more custom devices 130 are included in the peripheral device. For example, the peripheral device may implement a GSM modem that may be used to wirelessly connect the host computer 110 to the Internet. In such a peripheral device, the custom devices 130 may include a wireless modem, an Ethernet and/or other network device, and/or other custom devices 130. A custom device driver 160 is provided for each of the custom devices 130. For example, a custom device driver 160 may be provided for the wireless modem and for the network device. Custom device drivers 160 generally are not preinstalled in the operating system 112 of the host computer 110. The peripheral device 120 may also include standard devices, such as nonvolatile memory 150, also referred to as mass storage, in which the custom device drivers 160 are stored along with other instructions and/or data. A standard device driver for the mass storage 150 need not be included in the peripheral device 120, because the operating system 112 on the host computer 110 generally includes such a preinstalled driver.

Finally, still referring to FIG. 1, a default configuration 170 and an alternate configuration 180 are provided. As is well known to those having skill in the art, a configuration is a descriptor that includes hardware identifiers and parameter definitions for a given device or devices. The default configuration 170 contains only a device driver class interface or interfaces for which the operating system 112 includes preinstalled class level device drivers. Stated differently, the default configuration comprises a device driver class interface or interfaces for which the operating system includes preinstalled class level device drivers, at least one of which includes an automatic run routine, but does not comprise a device driver class interface for which the operating system does not include a preinstalled class level device driver. For example, the default configuration may only include a mass storage class interface. Other examples of device driver class interface or interfaces for which the operating system generally includes preinstalled class level device drivers are hub (network) devices, audio (loudspeaker, microphone) devices, printers and human interface devices (keyboard, mouse, joystick). The alternate configuration 180 contains custom device driver interfaces for the plurality of custom device drivers 160.

As will be described in more detail below, the controller 140 is configured to expose the default configuration 170 to the operating system 112 of the host computer 110 upon (initial and/or subsequent) connection of the peripheral device 120 to the host computer 110. The controller 140 is also configured to transmit the plurality of custom device drivers 160 to the host computer 110 in response to an "install" command from the host computer 110, and to switch from the default configuration 170 to the alternate configuration 180 in response to a "change" command from the host computer 110.

Some embodiments of the present invention may arise from recognition that one or more custom device drivers may be automatically installed from a peripheral device onto a host computer if the peripheral device can initially be usable with a driver that is built into the operating system. Moreover, the peripheral device should be able to "carry" its own driver(s), be able to expose that driver(s) to the operating system, and have an "auto-play" or "auto-run" routine (also referred to herein as an "automatic run routine") option in the operating system. As is well known to those having skill in the art, auto-play or auto-run is a mechanism to automatically start a program upon insertion of a device. For example, when a CD that is properly configured is inserted into a PC, the installation program will automatically start the CD without user interaction. Finally, the peripheral device 120 should have the ability to change its configuration dynamically when its new custom driver is loaded.

Accordingly, some embodiments of the present invention provide peripheral devices 120 that include a default configuration 170 and an alternate configuration 180. A USB interface 190 and/or other conventional host interfaces may be provided. Initially, in the default configuration 170, the peripheral device 120 will expose only a device driver class interface or interfaces for which the operating system 110 includes preinstalled class level device drivers, at least one of which includes an automatic run routine. For example, a mass storage device class interface may be exposed. An operating system 110, such as Windows, generally includes a built-in driver for this class of device. In addition, this class of device supports the auto-play functionality. The device driver class interface or interfaces for which the operating system includes preinstalled class level device drivers, will include a device installation program with a properly configured autorun.inf file (for a Windows device), to automatically start the device installation program. Moreover, if the custom device driver being installed is signed, no user input may be needed to install the custom driver. As is well known to those having skill in the art, a custom device driver is "signed" when it has been pre-tested and pre-authorized by the operating system provider and the provider's digital signature is embedded in the custom device driver.

Once installed, the custom device driver 160 will be a better match for the device 120. In Windows terms, this means that the new device 120 will match with a more exact ID match than the class match, which matched the default configuration class driver 170, such as the mass storage device class driver, so that the custom device driver 160 will load on subsequent device insertions. Upon loading, the new custom device driver 160 will request a configuration change, to change the configuration from the default configuration 170 to the alternate configuration 180 that includes the actual peripheral device functionality. This may be performed through a USB command to change to an alternate configuration, such as modem and network devices. Subsequently, the drivers for the real device functionality will be loaded as needed for the new device type.

Accordingly, in some embodiments, user interaction with the installation process may be reduced or minimized and, when the driver is signed, user interaction may actually be eliminated. As noted above, a signed driver indicates that the operating system provider has preauthorized installation of the driver and has applied a digital signature to the driver to indicate that it has been preauthorized. If the driver is signed, the user need not be prompted as to whether the user approves installation. Accordingly, in these embodiments, the need for user interaction can be eliminated.

Figure 2:
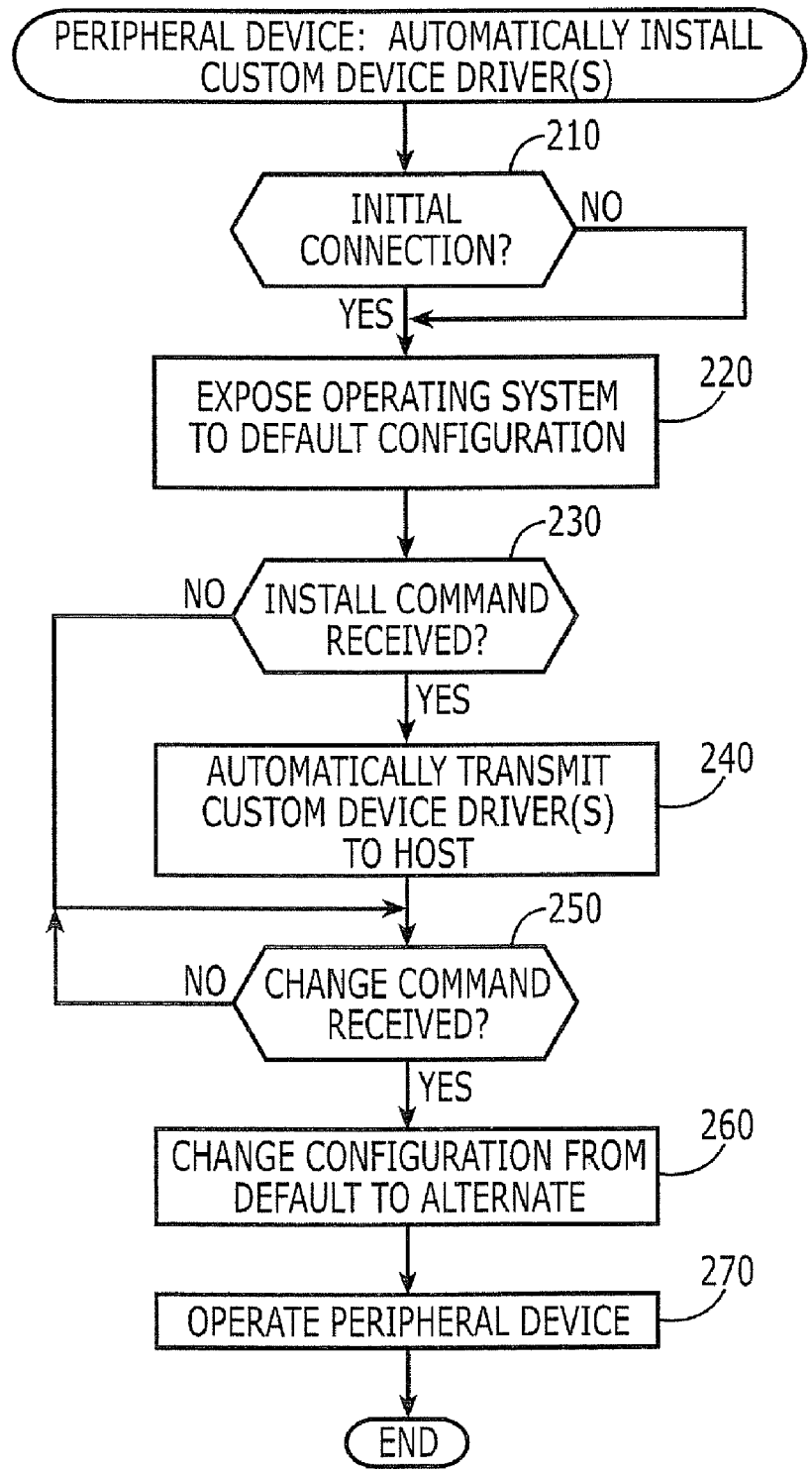
FIGS. 2-5 are flowcharts of operations that may be performed to automatically install custom device drivers according to various embodiments of the present invention.

FIG. 2 is a flowchart of operations that may be performed by a peripheral device, such as the peripheral device 120 of FIG. 1, to automatically install one or more custom device drivers for the peripheral device, such as custom device drivers 160, from the peripheral device onto a host computer, such as the host computer 110 of FIG. 1. These operations may be performed, for example, by the controller 140 of FIG. 1.

Referring to FIG. 2, at Block 210, whether or not the peripheral device 120 is being initially (first) connected to the host computer 110, or a second or subsequent connection is being effected, the operating system 110 is exposed to the default configuration 170 at Block 220. As was already described above, the default configuration 170 contains only a device driver class interface or interfaces for which the operating system includes preinstalled class level device drivers, at least one of which includes an automatic run routine. Stated differently, the default configuration comprises a device driver class interface or interfaces for which the operating system includes preinstalled class level device drivers, at least one of which includes an automatic run routine, but does not comprise a device driver class interface for which the operating system does not include a preinstalled class level device driver. Examples of such interfaces include Mass Storage Device (MSD) interfaces and Human Interface Device (HID) interfaces. Accordingly, in some embodiments of the present invention, the operating system 112 is exposed to the default configuration 170 each time it is connected to the host computer 110, regardless of whether the custom device drivers 160 have already been installed in the host computer 110. By initially exposing the operating system to the default configuration 170 whether or not this is the first or subsequent connection of the peripheral device 120 to the host computer 110, it can be assured that the installation of the custom devices drivers 160 is performed even when the peripheral device 120 is moved from one host computer 110 to another.

As was also noted above, at least one of the default device driver class interfaces for which the operating system includes preinstalled class level device drivers includes an automatic run routine. The automatic run routine may be configured to issue an "install" command, either directly from the automatic run routine and/or from an executable routine in the host computer that is pointed to by the automatic run routine. The install command may have any desired format that is recognized by the peripheral device 120. In any event, if this was the first time that the peripheral device 120 has been connected to the host computer 110, an install command will be received at Block 230. In response to the install command, at Block 240, the peripheral device 120 automatically transmits the one or more custom device drivers 160 from the peripheral device 120 to the host computer 110. The host computer 110 then installs the custom device driver(s) 160.

Once installed, the custom device driver(s) 160 transmit a "change" command. The change command may have any desired format that is recognized by the peripheral device 120.

In response to receiving the change command at Block 250, the peripheral device 120 changes its configuration from the default configuration 170 to the alternate configuration 180 that includes interfaces for the one or more custom device drivers 160 that were transmitted to the host, at Block 260. The peripheral device 120 is then operated at Block 270. It will also be understood that on second or subsequent connections of the peripheral device 120 to that host 110, the install command will not be received at Block 230. Rather, the change command will be received at Block 250 without requiring reinstallation of the custom device drivers.

It will be understood by those having skill in the art that one of the custom device drivers 160 may be for the same type of device as the drivers for which the operating system includes preinstalled class level device drivers. For example, the peripheral device 120 may actually include a custom mass storage device 130 therein. In order to reduce or avoid the possibility of an infinite loop between the default and alternate configurations, the common device in the alternate configuration should have a different driver that does not include a change configuration command.

Figure 3:
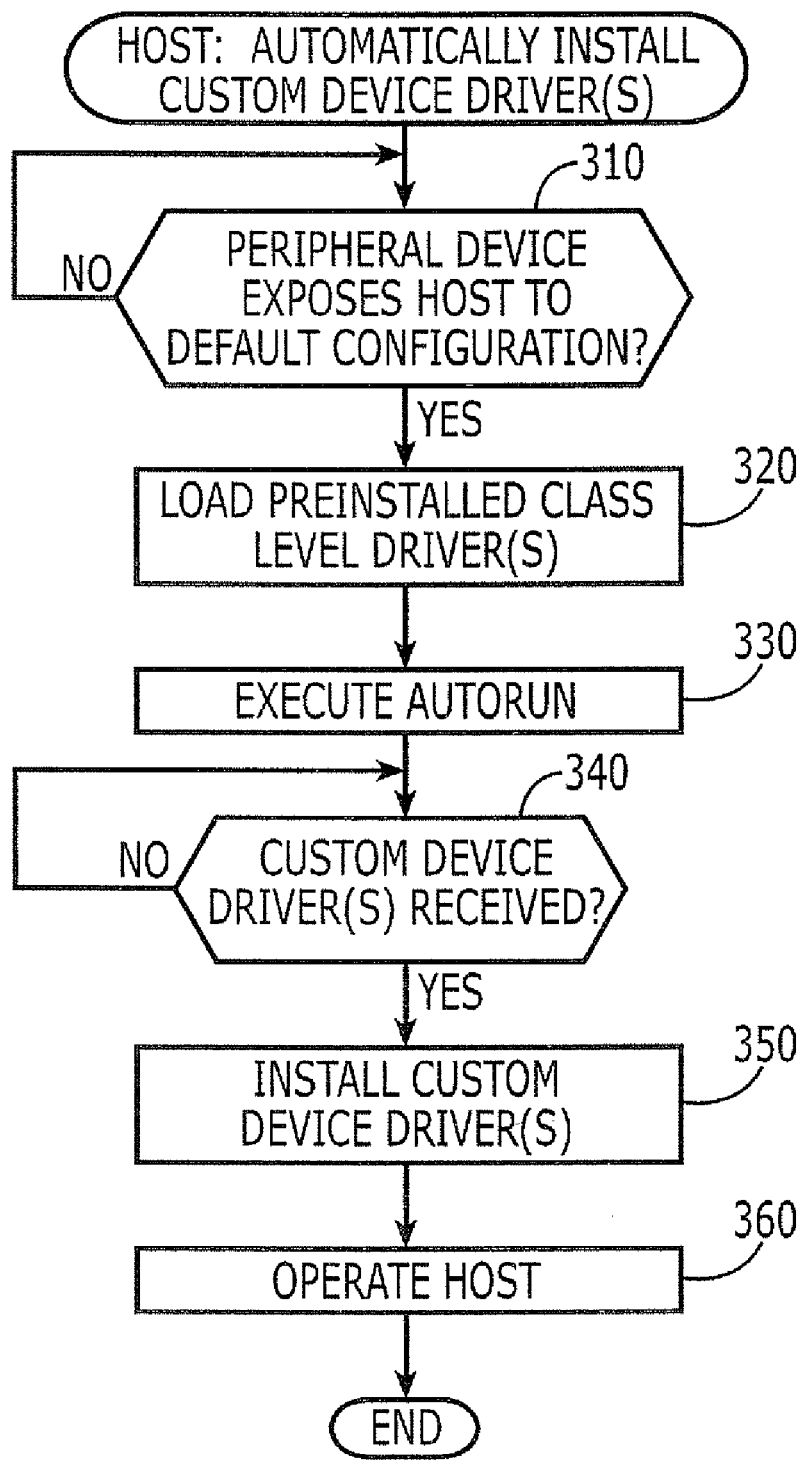

FIG. 3 is a flowchart of operations that may be performed by the host computer 110 to automatically install custom device driver(s) 160 according to various embodiments of the present invention. These operations may interact with the operations of FIG. 2, as will also be described.

Referring to FIG. 3, at Block 310, the host 110 is exposed to the default configuration 170 of the peripheral device 120 that contains only a device driver class interface or interfaces for which the operating system includes preinstalled class level device drivers, at least one of which includes an automatic run routine. In response, at Block 320, at least one of the driver device class level interface or interfaces for which the operating system includes preinstalled class level device drivers is loaded into the host 110. It will be understood that the host 110 may be exposed to the default configuration as a result of the operations of Block 220.

Then, at Block 330, the automatic run routine is executed to directly issue the install command to the peripheral device 120 or to start (point to) one or more executables that themselves issue the install command to the peripheral device 120. Then, at Block 340, in response to receiving the one or more custom device drivers 160 from the peripheral device 120, as a result, for example, of the operations of Block 240, the custom device drivers 160 are installed at Block 350. The custom device drivers 160 then cause a change command to be transmitted from the host 110, as was described in connection with Block 250, and the peripheral device 120 changes its configuration from default 170 to custom 180, as was described in connection with Block 260. The host 110 then operates with the custom device drivers 160 installed at Block 360, and the peripheral device 120 also operates with the host 110 as was described at Block 270.

Figure 4:
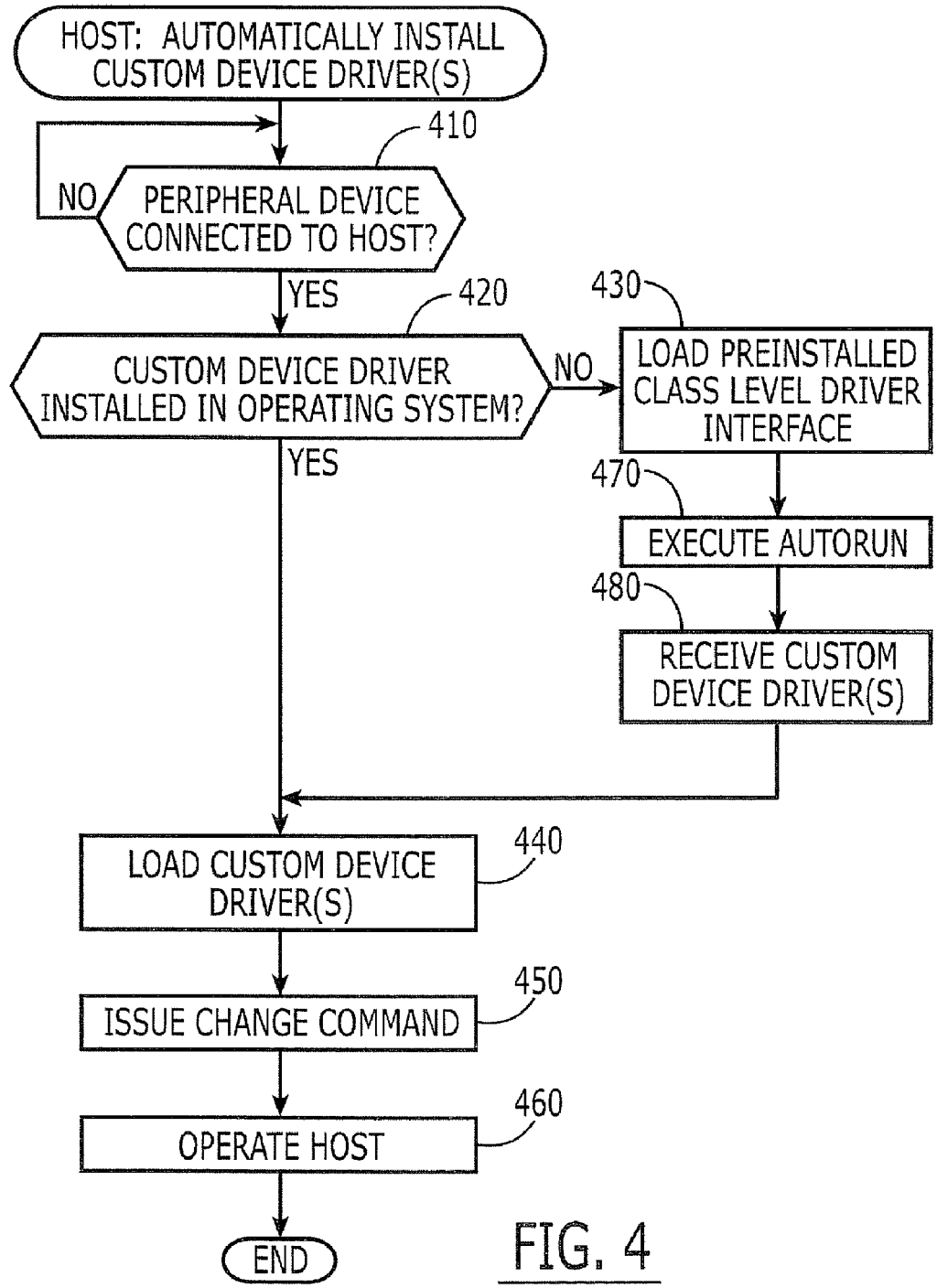

FIG. 4 is a flowchart of operations that may be performed by a host 110 to automatically install custom device drivers 160 according to various embodiments of the present invention. These embodiments describe operation of the host regardless of whether the custom device drivers 160 have already been installed. In particular, referring to FIG. 4, at Block 410, when the peripheral device 120 is connected to the host 110, a determination is made at Block 420 as to whether a custom device driver 160 for the peripheral device 120 has been installed in the operating system 112. More specifically, a determination is made as to whether a custom device driver 160 that matches a product identification for the peripheral device 120 is already installed in the operating system 112. If yes, then at Block 440, the custom device driver is loaded and, at Block 450, the change command is issued to the peripheral device 120 to change its configuration from the default configuration 170 to the alternate configuration 180 that includes interfaces for the one or more custom device drivers 160. The host 110 continues to operate at Block 460.

Referring again to Block 420, if a custom device driver that matches a product identification for the peripheral device 120 is not installed in the operating system 112, then at Block 450, loading is performed for at least one preinstalled driver class interface or interfaces that is exposed to the operating system by the peripheral device and for which the operating system includes preinstalled class level device driver, at least one of which includes an automatic run routine. The automatic run routine is then executed at Block 470, to directly or indirectly issue the change command to the peripheral device 120. Then, at Block 480, in response to receiving the one or more custom device drivers 160 from the peripheral device 120, the custom device drivers 160 are loaded or installed at Block 440.

Figure 5:
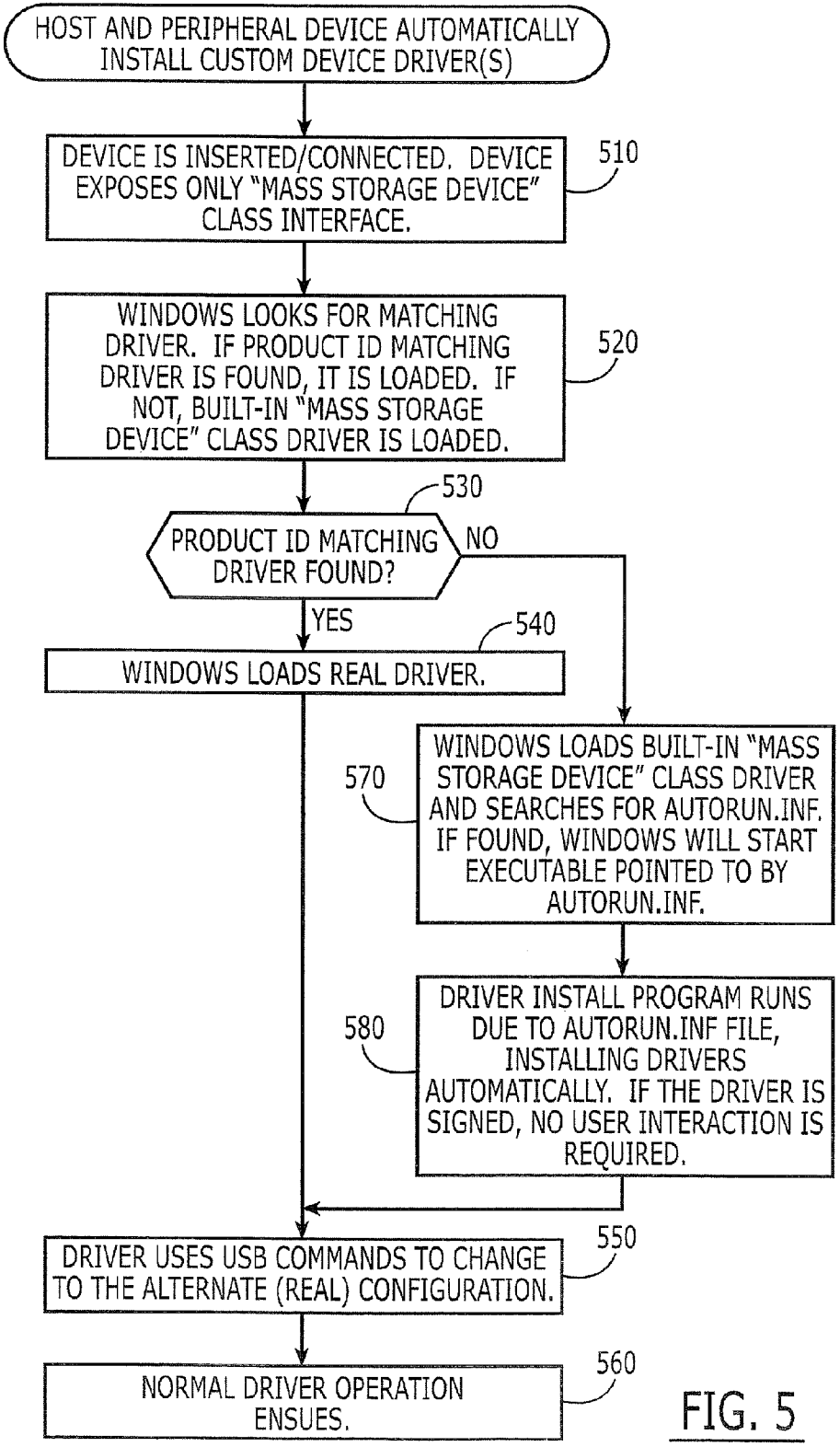

FIG. 5 is a block diagram of combined operations that may be performed by the host 110 and the peripheral device 120, to automatically install custom device drivers 160 according to various embodiments of the present invention. Embodiments of FIG. 5 assume that the host 110 is a PC, the operating system 112 is a Windows operating system and that the device driver class interface or interfaces for which the operating system includes a preinstalled class level device driver, at least one of which includes an automatic run routine, is a mass storage device class interface.

Referring now to FIG. 5, at Block 510, the peripheral device 120 is inserted or connected and the peripheral device 120 exposes only a mass storage device class interface as part of its default configuration. Then, at Block 520, the Windows operating system looks for a matching driver. If a product ID matching the driver is found, then that driver is loaded into the operating system 112. If not, then the built in mass storage device class driver is loaded. In particular, as shown at Block 530, a test is made as to whether a product ID matching the driver is found. If yes, indicating that this is the second or subsequent time that the peripheral device 120 has been connected, then at Block 540, Windows loads the real (custom) driver 160 for the peripheral device 120, and then this custom driver 160 uses USB commands to change the peripheral device 120 to the alternate (real or custom) configuration 180 at Block 550. Normal driver operation then ensues.

Returning again to Block 530, if a product ID matching the driver is not found in the operating system 112, indicating that this is the first time that the peripheral device 120 has been connected to this host 110, then at Block 570, Windows loads the built in mass storage device class driver, which then automatically searches for autorun.inf. If found, Windows will start the executable that is pointed to by autorun.inf. Then, at Block 580, the driver install program runs, directly or indirectly from the autorun.inf file, installing custom drivers 160 automatically. Moreover, if the custom driver(s) 160 are signed, user interaction may not be required. Operations then continue to Block 550, to change the configuration of the peripheral device and normal operation ensues at Block 560.

Accordingly, as shown in FIG. 5, at Block 510, some embodiments of the invention can always initially expose the mass storage device class interface or, more generally, a default configuration of the peripheral device that contains only a device driver class interface or interfaces for which the operating system includes preinstalled class level device drivers, at least one of which includes an automatic run routine. In contrast, in conventional techniques, such as described in the above-cited U.S. Pat. No. 6,754,725 and U.S. Patent Application Publication 2005/0038934, the operating system may be exposed to an interface that includes the custom driver upon connection of the peripheral device. Since the operating system is initially exposed to the custom interface, the operating system may search for the custom driver before it is installed. Such searching before installation may generate a user message to point to the driver, which may preclude automatic installation.

As also shown in FIG. 5, in some embodiments of the invention, only at Block 550, after Windows loads the custom driver (Block 540) or installs the custom driver 580, does the driver configuration switch to expose the interfaces for the custom drivers. Accordingly, there may never be a need to ask the user to provide a driver or point to a driver. Moreover, if the driver is already signed, which conventionally may be the case for custom drivers that are designed by reputable peripheral device designers, the custom driver can load and install automatically without sending the user a warning message as to whether they wish to install this unsigned driver. Accordingly, no user intervention may be needed.

Accordingly, embodiments of the invention may not allow an operating system to install a custom driver until the custom driver has been successfully loaded. User prompts may be reduced or eliminated. Finally, it will also be understood by those having skill in the art that the custom device drivers that are installed may also include application software therein, so that embodiments of the present invention may also be used to load application software in addition to drivers, without the need for user intervention.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of automatically installing one or more custom device drivers for a peripheral device from the peripheral device onto a host computer, the method comprising the following that are performed by the peripheral device:
    upon connecting the peripheral device to the host computer, exposing an operating system of the host computer to a default configuration of the peripheral device that comprises only a device driver class interface or interfaces for which the operating system includes preinstalled class level device drivers, at least one of which includes an automatic run routine but does not comprise a device driver class interface for which the operating system does not include a preinstalled class level device driver;
    in response to receipt of an install command directly from the automatic run routine in the host computer and/or from an executable routine in the host computer that is pointed to by the automatic run routine, automatically transmitting one or more custom device drivers from the peripheral device to the host computer;
    in response to receipt of a change command from the one or more custom device drivers that were transmitted to the host computer, changing configuration of the peripheral device from the default configuration to an alternate configuration that comprises interfaces for the one or more custom device drivers that were transmitted to the host computer; and
    then upon subsequently connecting the peripheral device to the host computer, again exposing the operating system on the host computer to the default configuration of the peripheral device, and, in response to receipt of a change command from the one or more custom device drivers on the host computer, changing configuration of the peripheral device from the default configuration to the alternate configuration.

2. A method according to claim 1 wherein the following are performed by the host computer:
    in response to exposure of the host computer to the default configuration of the peripheral device that comprises a device driver class interface or interfaces for which the operating system includes preinstalled class level device drivers, at least one of which includes an automatic run routine but does not comprise a device driver class interface for which the operating system does not include a preinstalled class level device driver, loading into the host computer at least one of the device driver class interface or interfaces for which the operating system includes preinstalled class level device drivers, at least one of which includes an automatic run routine, and executing the automatic run routine to issue the install command to the peripheral device directly from the automatic run routine and/or from the executable routine that is pointed to by the automatic run routine; and
    in response to receiving the one or more custom device drivers from the peripheral device, installing the one or more custom device drivers on the host computer.

3. A method according to claim 1 wherein the following are performed by the host computer in response to exposing or again exposing the operating system on the host computer to the default configuration of the peripheral device that comprises a driver class interface or interfaces for which the operating system includes preinstalled class level device drivers, at least one of which includes an automatic run routine but does not comprise a device driver class interface for which the operating system does not include a preinstalled class level device driver:
    if a custom device driver that matches a product identification for the peripheral device is installed in the operating system, loading the custom device driver and issuing a change command to the peripheral device to change its configuration from the default configuration to the alternate configuration; and
    if a custom device driver that matches a product identification for the peripheral device is not installed in the operating system, loading at least one of the driver class interface or interfaces for which the operating system includes preinstalled class level device drivers, at least one of which includes an automatic run routine, executing the automatic run routine to issue the install command to the peripheral device directly from the automatic run routine and/or from the executable routine that is pointed to by the automatic run routine, and in response to receiving the one or more custom device drivers from the peripheral device, installing the one or more custom device drivers on the host computer.

4. A method according to claim 1 wherein the operating system is a personal computer operating system, the peripheral device is a Universal Serial Bus device and the device driver class interface or interfaces for which the operating system includes preinstalled class level device drivers, at least one of which includes an automatic run routine comprise a mass storage device class interface.

5. A method according to claim 1 wherein the custom device drivers comprise a custom mass storage device driver, a custom modem device driver and a custom network device driver.

6. A method according to claim 1 wherein the one or more custom device drivers are one or more signed custom device drivers and wherein the method further comprises automatically installing the one or more signed custom device drivers on the host computer without user intervention.

7. A method according to claim 1, wherein the peripheral device comprises a computer program product, the computer program product comprising a computer usable storage medium having computer-readable program code embodied in the medium, the computer readable program code configured to perform the changing of the configuration of the peripheral device from the default configuration to the alternate configuration.

8. A method of installing one or more custom device drivers for a peripheral device from the peripheral device onto a host computer comprising the following that are performed by an operating system of the host computer in response to connecting the peripheral device to the host computer:
   if a custom device driver that matches a product identification for the peripheral device is installed in the operating system, loading the custom device driver and issuing a change command to the peripheral device to change its configuration from a default configuration to an alternate configuration that includes interfaces for the one or more custom device drivers; and
   if a custom device driver that matches a product identification for the peripheral device is not installed in the operating system, loading at least one driver class interface or interfaces that is exposed to the operating system by the peripheral device and for which the operating system includes preinstalled class level device drivers, at least one of which includes an automatic run routine, executing the automatic run routine to issue the change command to the peripheral device directly from the automatic run routine and/or from an executable routine that is pointed to by the automatic run routine, and in response to receiving the one or more custom device drivers from the peripheral device, installing the one or more custom device drivers on the host computer.

9. A method according to claim 8 wherein the operating system is a personal computer operating system, the peripheral device is a Universal Serial Bus device and the device driver class interface or interfaces for which the operating system includes preinstalled class level device drivers, at least one of which includes an automatic run routine comprise a mass storage device class interface.

10. A method according to claim 8 wherein the custom device drivers comprise a custom mass storage device driver, a custom modem device driver and a custom network device driver.

11. A method according to claim 8 wherein the one or more custom device drivers are one or more signed custom device drivers and wherein the method further comprises automatically installing the one or more signed custom device drivers on the host computer without user intervention.

12. A method according to claim 8, wherein the host computer comprises a computer program product, the computer program product comprising a computer usable storage medium having computer-readable program code embodied in the medium, the computer readable program code configured to perform the issuing of the change command to the peripheral device to change its configuration from the default configuration to the alternate configuration.

13. A peripheral device that is configured to connect to a host computer, the peripheral device comprising:
   a plurality of custom devices for which custom device drivers are not preinstalled in an operating system of the host computer;
   a default configuration that comprises a device driver class interface or interfaces for which the operating system includes preinstalled class level device drivers but does not comprise a device driver class interface for which the operating system does not include a preinstalled class level device driver;
   an alternate configuration that comprises custom device driver interfaces for the plurality of custom device drivers;
   a plurality of custom device drivers for the plurality of custom devices; and
   a controller that is configured to expose the default configuration to the operating system of the host computer upon connection of the peripheral device to the host computer, to transmit the plurality of custom device drivers to the host computer in response to an install command from the host computer and to switch from the default configuration to the alternate configuration in response to a change command from the host computer.

14. A device according to claim 13 wherein the custom device drivers comprise a custom mass storage device driver, a custom modem device driver and a custom network device driver.

15. A device according to claim 13 wherein the one or more custom device drivers are one or more signed custom device drivers.

16. A device according to claim 13, wherein the peripheral device further comprises a computer program product, the computer program product comprising a computer usable storage medium having computer-readable program code embodied in the medium, the computer readable program code configured to provide the default configuration, the alternate configuration, the custom device drivers and the controller.

* * * * *

UNITED STATES PATENT AND TRADEMARK OFFICE
CERTIFICATE OF CORRECTION

PATENT NO. : 8,171,502 B2  
APPLICATION NO. : 11/564553  
DATED : May 1, 2012  
INVENTOR(S) : Mullis, II et al.

It is certified that error appears in the above-identified patent and that said Letters Patent is hereby corrected as shown below:

In the Claims:

Column 12, Claim 4, Line 65: Please correct "Universal Serial Bus"
to read -- Universal Serial Bus (USB) --

Column 13, Claim 9, Line 47: Please correct "Universal Serial Bus"
to read -- Universal Serial Bus (USB) --

Signed and Sealed this
Fourteenth Day of August, 2012

David J. Kappos
*Director of the United States Patent and Trademark Office*